(12) United States Patent
Unoki et al.

(10) Patent No.: US 11,495,804 B2
(45) Date of Patent: Nov. 8, 2022

(54) AIR ELECTRODE CATALYST FOR AIR SECONDARY BATTERY AND AIR SECONDARY BATTERY

(71) Applicants: FDK CORPORATION, Tokyo (JP); JAPAN METALS AND CHEMICALS CO., LTD., Tokyo (JP)

(72) Inventors: Shohei Unoki, Tokyo (JP); Takeshi Kajiwara, Tokyo (JP); Takahiro Endo, Tokyo (JP); Shigekazu Yasuoka, Tokyo (JP); Yoshikatsu Watanabe, Yamagata (JP)

(73) Assignees: FDK CORPORATION, Tokyo (JP); JAPAN METALS AND CHEMICALS CO., LTD., Tokyo (JP)

(*) Notice: Subject to any disclaimer, the term of this patent is extended or adjusted under 35 U.S.C. 154(b) by 111 days.

(21) Appl. No.: 16/781,192

(22) Filed: Feb. 4, 2020

(65) Prior Publication Data
US 2020/0251746 A1    Aug. 6, 2020

(30) Foreign Application Priority Data
Feb. 4, 2019 (JP) .............................. JP2019-018099

(51) Int. Cl.
*H01M 4/90* (2006.01)
*H01M 12/08* (2006.01)
(Continued)

(52) U.S. Cl.
CPC .......... *H01M 4/9016* (2013.01); *H01M 4/383* (2013.01); *H01M 12/08* (2013.01);
(Continued)

(58) Field of Classification Search
CPC ........... H01M 12/08; H01M 2004/027; H01M 2004/8689; H01M 4/383; H01M 4/9016
See application file for complete search history.

(56) References Cited

U.S. PATENT DOCUMENTS

| 4,959,494 A * | 9/1990 | Felthouse | ................ B01J 23/40 |
| | | | 568/360 |
| 2013/0302705 A1* | 11/2013 | Yoshida | ................ H01M 12/08 |
| | | | 429/405 |

FOREIGN PATENT DOCUMENTS

| JP | 2006196329 A | * | 7/2006 |
| JP | 2006196329 A | | 7/2006 |

OTHER PUBLICATIONS

Machine translation of JP-2006196329-A, Morimitsu (Year: 2006).*

* cited by examiner

*Primary Examiner* — Stewart A Fraser
*Assistant Examiner* — Brent C Thomas
(74) *Attorney, Agent, or Firm* — Kinney & Lange, P.A.

(57) ABSTRACT

An air electrode catalyst for an air secondary battery includes a pyrochlore-type composite oxide having two or more crystal structures having a different amount of oxygen. A battery, according to some embodiments, includes an electrode group including an air electrode and a negative electrode stacked with a separator therebetween, and a container accommodating the electrode group along with an alkali electrolyte solution, wherein the air electrode includes the air electrode catalyst. The air electrode catalyst may have a pyrochlore-type composite oxide having a crystal structure represented by $Bi_2Ru_2O_{6.92}$ and a crystal structure represented by $Bi_2Ru_2O_{7.33}$.

3 Claims, 5 Drawing Sheets

(51) Int. Cl.
 *H01M 4/38* (2006.01)
 *H01M 4/02* (2006.01)
 *H01M 4/86* (2006.01)
(52) U.S. Cl.
 CPC ................ *H01M 2004/027* (2013.01); *H01M 2004/8689* (2013.01)

AIR ELECTRODE CATALYST FOR AIR SECONDARY BATTERY AND AIR SECONDARY BATTERY

CROSS-REFERENCE TO RELATED APPLICATION(S)

This application claims priority to Japanese Application No. 2019-018099 filed on Feb. 4, 2019, which is hereby incorporated by reference in its entirety.

BACKGROUND

Technical Field

The present disclosure relates to an air electrode catalyst for an air secondary battery and an air secondary battery.

Description of the Related Art

Air batteries, which use oxygen in air as a positive electrode active material, have attracted attention recently because of their high energy density, compact size, and ease of weight reduction. With respect to such air batteries, zinc air primary batteries have been put to practical use as the power source for hearing aids.

Further, as rechargeable air batteries, air secondary batteries in which Li, Zn, Al, or Mg is used as negative electrode metal have been studied. Such air secondary batteries are expected to be developed as novel secondary batteries having an energy density higher than that of lithium ion secondary batteries.

In the air secondary batteries including negative electrode metal described above, however, a dissolution and precipitation reaction of the negative electrode metal is repeated due to a chemical reaction on charging and discharging batteries (hereinbelow, referred to as a battery reaction). Then, the negative electrode metal is subjected to dendritic growth, in which the metal is dendritically precipitated, problematically leading to internal short-circuiting, and a shape of the negative electrode changes due to a shape change, problematically leading to decreasing of the battery capacity. Thus, such batteries have not been yet put into practical use.

As one type of air secondary battery, there has been studied an air hydrogen secondary battery in which an alkaline aqueous solution (alkali electrolyte solution) is used as the electrolyte solution and hydrogen is used as the negative electrode active material (e.g., see Japanese Patent No. 4568124). In air hydrogen secondary batteries represented by that of Japanese Patent No. 4568124, despite use of a hydrogen storage alloy as the negative electrode metal, the negative electrode active material in the air hydrogen secondary battery is hydrogen, which is stored into and released from this hydrogen storage alloy. Thus, no dissolution and precipitation reaction of the hydrogen storage alloy itself occurs due to a battery reaction. For this reason, there occurs no problem in air hydrogen secondary batteries such as internal short-circuiting caused by the dendritic growth described above, and reduced battery capacity caused by the shape change described above.

In an air secondary battery in which an alkali electrolyte solution is used as in the air hydrogen secondary battery described above, a charge and discharge reaction shown below occur in the positive electrode (hereinbelow, referred to as the air electrode).

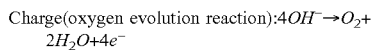

Charge(oxygen evolution reaction):$4OH^- \rightarrow O_2 + 2H_2O + 4e^-$ (I)

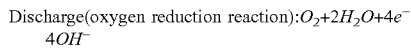

Discharge(oxygen reduction reaction):$O_2 + 2H_2O + 4e^- \rightarrow 4OH^-$ (II)

The air electrode in the air secondary battery produces oxygen and water on charging, as represented by the reaction formula (I) and reduces oxygen to produce hydroxide ions on discharging, as represented by the reaction formula (II). Oxygen generated in the air electrode is released into the atmosphere from the portion open to the atmosphere in the air electrode.

In the air secondary battery described above, the energy efficiency has not yet reached a sufficient value, and sufficient high output has not yet been achieved. For this reason, in order to put air secondary batteries into practical use, further improvement in the energy efficiency and high output are required.

One of factors preventing the further improvement in the energy efficiency and high output described above is large overvoltage of the discharge reaction, that is, of the oxygen reduction reaction, in the air electrode.

SUMMARY

According to the present disclosure, provided is an air electrode catalyst for an air secondary battery, including a pyrochlore-type composite oxide represented by the general formula: $A_{2-x}B_{2-y}O_{7-z}$, wherein x, y, and z satisfy relations of $0 \leq x \leq 1$, $0 \leq y \leq 1$ and $-0.5 \leq z \leq 0.5$ respectively, A represents at least one element selected from Bi, Pb, Tb, La, Ce, Pr, Nd, Pm, Sm, Eu, Gd, Dy, Ho, Er, Tm, Yb, Lu, Mn, Y, Zn, and Al, and B represents at least one element selected from Ru, Ir, Si, Ge, Ta, Sn, Hf, Zr, Ti, Nb, V, Sb, Rh, Cr, Re, Sc, Co, Cu, In, Ga, Cd, Fe, Ni, W, and Mo, the pyrochlore-type composite oxide having two or more crystal structures having a different amount of oxygen.

BRIEF DESCRIPTION OF THE DRAWINGS

The present disclosure will become more fully understood from the detailed description given hereinafter and the accompanying drawings which are given by way of illustration only, and thus, are not limitative of the present disclosure, and wherein.

DETAILED DESCRIPTION

Hereinbelow, an air hydrogen secondary battery 2 (hereinbelow, referred to as the battery 2) including an air electrode catalyst for an air secondary battery according to the present disclosure will be described with reference to the drawings.

Figure 1:
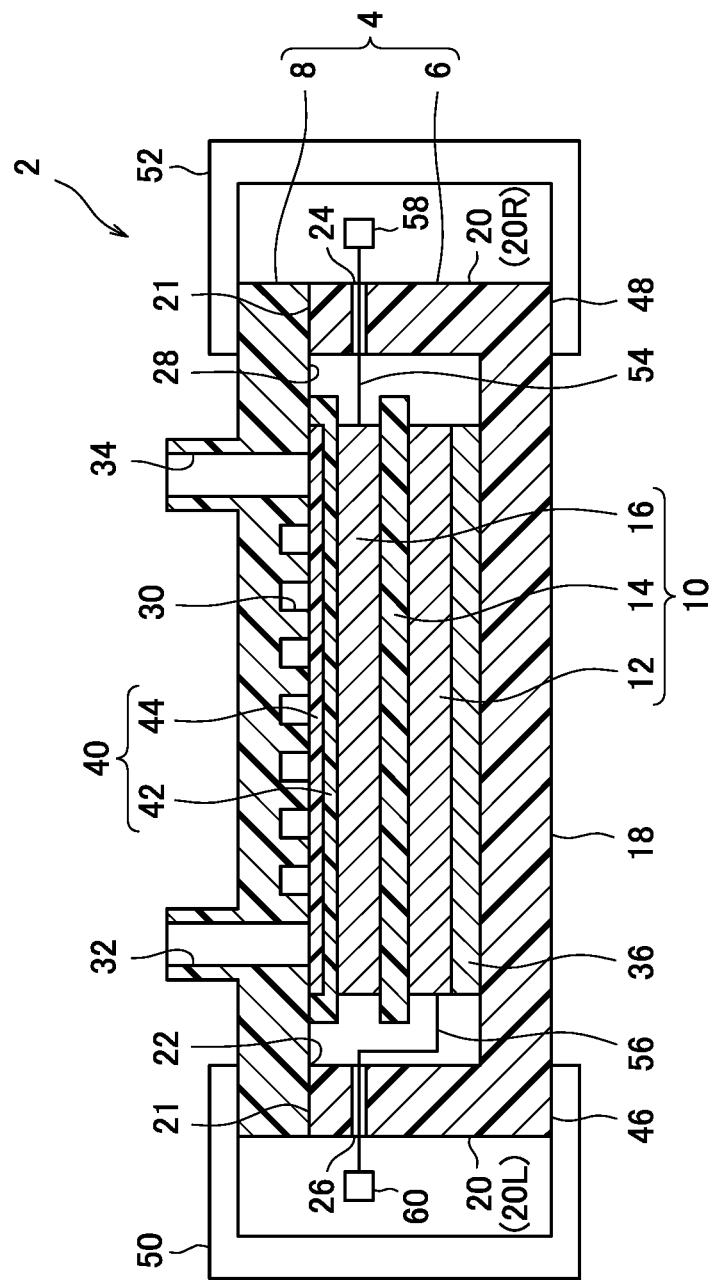
FIG. 1 is a cross-sectional view schematically showing an air hydrogen secondary battery according to an embodiment of the present invention.

As shown in FIG. 1, the battery 2 includes a container 4 and an electrode group 10 placed in the container 4 together with an electrolytic solution (not shown).

The electrode group 10 is formed by stacking an air electrode (positive electrode) 16 on a negative electrode 12 with a separator 14 therebetween.

The negative electrode 12 includes a conductive negative electrode substrate that forms a porous structure and has a large number of pores and a negative electrode mixture supported inside the pores and on the surface of the negative electrode substrate. Examples of the negative electrode substrate described above include foam nickel.

The negative electrode mixture includes a hydrogen storage alloy powder, which is an assembly of hydrogen storage alloy particles that can store and release hydrogen as a negative electrode active material, a conductive material, and a binder. Here, examples of the conductive material include graphite, carbon black, or the like.

As the hydrogen storage alloy constituting the hydrogen storage alloy particles, which is not particularly limited, a rare earth-Mg-Ni-based hydrogen storage alloy is used. The composition of this rare earth-Mg-Ni-based hydrogen storage alloy can be optionally selected. For example, one represented by the general formula:

$$Ln_{1-a}Mg_aNi_{b-c-d}Al_cM_d \quad (III)$$

is preferably used.

In the general formula (III), Ln represents at least one element selected from the group consisting of La, Ce, Pr, Nd, Pm, Sm, Eu, Gd, Tb, Dy, Ho, Er, Tm, Yb, Lu, Sc, Y, Zr, and Ti, M represents at least one element selected from the group consisting of V, Nb, Ta, Cr, Mo, Mn, Fe, Co, Ga, Zn, Sn, In, Cu, Si, P, and B, and subscripts a, b, c, and d represent numbers that satisfy the relations of $0.01 \leq a \leq 0.30$, $2.8 \leq b \leq 3.9$, $0.05 \leq c \leq 0.30$, and $0 \leq d \leq 0.50$ respectively.

Here, hydrogen storage alloy particles are obtained as follows, for example.

First, metal raw materials are weighed to achieve a predetermined composition and mixed. This mixture is melted under an inert gas atmosphere in a high-frequency induction melting furnace, for example, and then cooled to form an ingot. The ingot obtained is heated to 900 to 1200° C. under an inert gas atmosphere. The ingot is subjected to a thermal treatment at this temperature for 5 to 24 hours and thus homogenized. Thereafter, this ingot is pulverized and sieved to thereby obtain a hydrogen storage alloy powder, which is an assembly of hydrogen storage alloy particles having a desired particle size.

Examples of a binder to be used include sodium polyacrylate, carboxymethyl cellulose, and styrene butadiene rubber.

The negative electrode 12 here can be produced as follows, for example.

First, a hydrogen storage alloy powder, which is an assembly of hydrogen storage alloy particles, a conductive material, a binder, and water are kneaded to prepare a negative electrode mixture paste. The negative electrode mixture paste obtained is packed into a negative electrode substrate and then subjected to a drying treatment. After drying, the negative electrode substrate having the hydrogen storage alloy particles and the like attached thereto is rolled to increase the alloy content per volume. Thereafter, the rolled substrate is cut to thereby produce the negative electrode 12. This negative electrode 12 is in a plate form as a whole.

Next, the air electrode 16 includes a conductive air electrode substrate that forms a porous structure and has a large number of pores and an air electrode mixture (positive electrode mixture) supported inside the pores and on the surface of the air electrode substrate. Examples of the air electrode substrate described above include foam nickel and nickel mesh.

The air electrode mixture includes an air electrode catalyst for an air secondary battery, a conductive material, and a binder. As the catalyst for an air secondary battery, a pyrochlore-type composite oxide is used. The pyrochlore-type composite oxide may have dual functions for oxygen generation and oxygen reduction. Such a catalyst having dual functions contributes to reduction in overvoltage of a battery both in the charging process and discharging process.

In the present disclosure, as an air electrode catalyst for an air secondary battery, there is used a pyrochlore-type composite oxide represented by the general formula: $A_{2-x}B_{2-y}O_{7-z}$, (wherein x, y, and z satisfy the relations of $0 \leq x \leq 1$, $0 \leq y \leq 1$ and $-0.5 \leq z \leq 0.5$ respectively, A represents at least one element selected from Bi, Pb, Tb, La, Ce, Pr, Nd, Pm, Sm, Eu, Gd, Dy, Ho, Er, Tm, Yb, Lu, Mn, Y, Zn and Al, and B represents at least one element selected from Ru, Ir, Si, Ge, Ta, Sn, Hf, Zr, Ti, Nb, V, Sb, Rh, Cr, Re, Sc, Co, Cu, In, Ga, Cd, Fe, Ni, W, and Mo) and having two or more crystal structures having a different amount of oxygen.

Preferably, a two-phase pyrochlore-type composite oxide having a first crystal structure and a second crystal structure is used.

Here, it is preferable to satisfy the relation of Q<R where Q is the amount of oxygen in the first crystal structure and R is the amount of oxygen in the second crystal structure. That is, it is preferable that a pyrochlore-type composite oxide according to the present disclosure has two crystal structures having a different amount of oxygen.

The present inventor has found that a pyrochlore-type composite oxide exhibits excellent catalytic activity by including two or more phases of crystal structures having a different amount of oxygen. In a pyrochlore-type composite oxide, an amount of oxygen in the crystal structures has a significant effect on oxygen reduction and a combination of two or more crystal structures produces a synergistic effect. As a result, it is considered that multiple functions of catalyst are produced as follows: a bond strength between oxygen and a surface of air electrode catalyst is changed, and a decomposition of hydrogen peroxide ion ($HO_2^-$), which is an intermediate generated in the process of a two-electron reduction pathway as described below, is promoted.

Here, the electrochemical reductive mechanism of oxygen in an alkali electrolyte solution includes a two-electron reduction pathway represented by the following formula (IV), in addition to the direct four-electron reduction pathway represented by the formula (II) described above. This two-electron reduction pathway produces hydrogen peroxide ion ($HO_2^-$) as an intermediate.

$$O_2 + H_2O + 2e^- \rightarrow HO_2^- + OH^- \quad (IV)$$

$HO_2^-$ adsorbs to the electrode surface to prevent the reaction and adversely affects the battery reaction, thereby causing increase in overvoltage of the battery. However, an air electrode catalyst containing a pyrochlore-type composite oxide having a two-phase crystal structure according to the present disclosure is considered to promote a decomposition of $HO_2^-$ to thereby allow the reaction of the following formula (V) to proceed.

$$2HO_2^- \rightarrow 2OH^- + O_2 \quad (V)$$

The whole reaction from the formulas (IV) and (V) described above will be the same as that of the formula (II).

As pyrochlore-type composite oxide used in the present disclosure, bismuth ruthenium oxide is preferably used. This bismuth ruthenium oxide is a catalyst having a dual function of oxygen generation and oxygen reduction.

In addition, as pyrochlore-type composite oxide having a different amount of oxygen, it is more preferable to use a pyrochlore-type composite oxide at least having a crystal structure represented by $Bi_2Ru_2O_{6.92}$ or a crystal structure similar to the crystal structure represented by $Bi_2Ru_2O_{6.92}$, and a crystal structure represented by $Bi_2Ru_2O_{7.33}$ or a crystal structure similar to the crystal structure represented by $Bi_2Ru_2O_{7.33}$.

In respect of a method for producing a catalyst for an air secondary battery, a pyrochlore-type bismuth-ruthenium oxide, as an example, will be specifically described below.

$Bi(NO_3)_3.5H_2O$ and $RuCl_3.3H_2O$ were introduced at the same concentration into distilled water and stirred to prepare a mixed aqueous solution of $Bi(NO_3)_3.5H_2O$ and $RuCl_3.3H_2O$. The temperature of the distilled water at this time is set at 60° C. or more and 90° C. or less. Then, a 1 mol/L or more and 3 mol/L or less NaOH aqueous solution is added to this mixed aqueous solution. While the bath temperature at this time is maintained at 60° C. or more and 90° C. or less, the solution is stirred under oxygen bubbling. While the solution containing a precipitate generated by this operation is maintained at 80° C. or more and 100° C. or less, a portion of the moisture is evaporated to form a paste. This paste is transferred to an evaporating dish and heated to 100° C. or more and 150° C. or less. The paste is dried while maintained in the state for 10 hours or more and 20 hours or less to obtain a dried product of the paste. After pulverized in a mortar, this dried product is heated under an air atmosphere to 350° C. or more and 550° C. or less. The dried product is calcined while maintained for 0.5 hours or more and 24 hours or less to obtain a calcined product. The calcined product obtained is washed with distilled water at 60° C. or more and 90° C. or less and then dried. This results in a pyrochlore-type bismuth-ruthenium oxide.

Subsequently, the bismuth-ruthenium oxide prepared is preferably subjected to an acid treatment, wherein the oxide is immersed in a nitric acid aqueous solution. The treatment is specifically as follows.

First, a nitric acid aqueous solution is provided. Here, the concentration of the nitric acid aqueous solution is preferably 5 mol/L or less. The amount of the nitric acid aqueous solution to be provided is preferably 20 mL per 1 g of a bismuth-ruthenium oxide. The temperature of the nitric acid aqueous solution is preferably set at 20° C. or more and 25° C. or less.

Then, in the nitric acid aqueous solution provided, the bismuth-ruthenium oxide is immersed and stirred for 6 hours or less. After a predetermined time period elapses, the bismuth-ruthenium oxide is filtered with suction from the nitric acid aqueous solution. The bismuth-ruthenium oxide filtered is introduced in and washed with ion exchanged water set at 60° C. or more and 80° C. or less.

The washed bismuth-ruthenium oxide is subjected to a drying treatment while maintained under an environment of 100° C. or more and 120° C. or less for 1 hours or more and 2 hours or less.

In the manner as mentioned above, the bismuth-ruthenium oxide subjected to the acid treatment is obtained. Applying the acid treatment as mentioned above enables removal of by-products generated during the production process of the bismuth-ruthenium oxide (pyrochlore-type composite oxide). Note that the acidic aqueous solution used in the acid treatment is not limited to nitric acid aqueous solutions and hydrochloric acid aqueous solution and sulfuric acid aqueous solution can be used in addition to nitric acid aqueous solutions. In these hydrochloric acid aqueous solutions and sulfuric acid aqueous solutions, an effect of enabling by-products to be removed can be provided as in the case of nitric acid aqueous solutions.

Next, the conductive material will be described. This conductive material is employed as a support for the catalyst described above, in order to reduce the internal resistance for the purpose of achieving high power of the air secondary battery. A nickel powder, which is an assembly of nickel particles, is preferably used as the conductive material in the present disclosure. As the nickel particles described above, particles having an average particle size of 0.1 μm to 10 μm, for example, are preferably used. Here, in the present disclosure, the average particle size refers to a volume average particle size obtained by measuring a particle size distribution on a volume basis of powder, which is an assembly of particles to be targeted, by a laser diffraction-scattering particle size distribution analyzer.

In the air electrode mixture, 60% by mass or more of the nickel powder described above is preferably contained. The upper limit of the content of the nickel powder is preferably 80% by mass or less, in connection with the other constituents in the air electrode mixture.

The conductive material is not limited to the nickel powder described above, and a metal-coated conductive filler, which is a core material coated with a metal material, also can be used. This metal-coated conductive filler, which is lighter than metal particles entirely formed by a metal, contributes to weight reduction of the entire air electrode. Examples of the core material described above include, but are not particularly limited to, silica particles. Then, as the metal-coated layer, nickel is preferably employed. In the air electrode mixture, 30% by mass or more of a metal-coated conductive filler powder, which is an assembly of such a metal-coated conductive filler, is preferably contained.

The binder binds the constituents of the air electrode mixture to each other, and additionally serves to impart suitable water repellency to the air electrode 16. Here, examples of the binder include, but are not particularly limited to, fluorine resins. Note that, as a preferable fluorine resin, polytetrafluoroethylene (PTFE) is used, for example.

The air electrode 16 can be produced as follows, for example.

First, an air electrode mixture paste is prepared including a bismuth-ruthenium oxide, a conductive material, a binder, and water.

The air electrode mixture paste obtained is shaped into a sheet form, and then is pressure-bonded by a press onto nickel mesh (an air electrode substrate). Thereby, an intermediate product for an air electrode is obtained.

The intermediate product obtained is then introduced in a calciner and subjected to a calcining treatment. This calcining treatment is carried out under an inert gas atmosphere. As this inert gas, nitrogen gas or argon gas is used, for example. As the calcining treatment conditions, the intermediate product is heated to a temperature of 300° C. or more and 400° C. or less and maintained in this state for 10 minutes or more and 20 minutes or less. Thereafter, the intermediate product is naturally cooled in the calciner and taken out in the atmosphere when the temperature of the intermediate product is lowered to 150° C. or less. Thereby, obtained is an intermediate product subjected to the calcining treatment. The air electrode 16 is obtained by cutting the intermediate product after this calcining treatment into a predetermined shape.

The air electrode 16 obtained as described above and the negative electrode 12 are stacked with the separator 14 therebetween to thereby form the electrode group 10. This separator 14 is provided to prevent short-circuiting between the air electrode 16 and the negative electrode 12, and an electrically insulating material is employed therefor. As the material employed for this separator 14, non-woven fabric of polyamide fibers to which hydrophilic functional groups are imparted, and non-woven fabric of polyolefin fibers such as polyethylene and polypropylene to which hydrophilic functional groups are imparted can be used.

The formed electrode group 10 is put in the container 4 together with an alkaline electrolytic solution. The container 4 is not particularly limited as long as it can accommodate the electrode group 10 and an alkaline electrolytic solution. For example, an acrylic box-shaped container 4 is used. The container 4 includes, for example, a container body 6 and a lid 8 as shown in FIG. 1.

The container body 6 has a box shape having a bottom wall 18 and side walls 20 extending upward from a peripheral edge of the bottom wall 18. The portion surrounded by an upper edge 21 of the side wall 20 is open. That is, an opening 22 is provided on the opposite side of the bottom wall 18. Further, the side walls 20 are provided with through holes at respective predetermined positions on the right side wall 20R and the left side wall 20L, and these through holes serve as lead wire outlets 24 and 26, which will be described later.

A shape of the lid 8 in the plan view is the same as that of the container body 6. The lid 8 covers the upper portion of the container body 6, and closes the opening 22. When the lid 8 is placed on the container body 6, a space between the lid 8 and the upper edge 21 of the side wall is sealed in a liquid-tight manner.

In the lid 8, a venting passage 30 is provided on an inner surface 28 facing the inside of the container body 6. The portion of the venting passage 30 that faces the inside of the container body 6 is open, and has a single serpentine shape as a whole. Further, an inlet side venting hole 32 and an outlet side venting hole 34 penetrating in the thickness direction are provided at predetermined positions of the lid 8. The inlet side venting hole 32 communicates with one end of the venting passage 30, and the outlet side venting hole 34 communicates with the other end of the venting passage 30. That is, the venting passage 30 is opened to the atmosphere via the inlet side venting hole 32 and the outlet side venting hole 34.

An adjustment member 36 is disposed on the bottom wall 18 of the container body 6 as necessary. In the container 4, the adjustment member 36 is used for alignment of the electrode group 10 in the height direction. Examples of the adjustment member 36 include a foamed nickel sheet.

The electrode group 10 is provided on the adjustment member 36. At this time, the negative electrode 12 of the electrode group 10 is disposed in contact with the adjustment member 36.

Meanwhile, a water repellent venting member 40 is disposed on the air electrode 16 side of the electrode group 10 so as to be in contact with the air electrode 16. The water repellent venting member 40 is a combination of a PTFE, porous film 42 and a nonwoven fabric diffusion paper 44. The water repellent venting member 40 exhibits a water repellent effect by PTFE and allows gas to pass therethrough. The water repellent venting member 40 is interposed between the lid 8 and the air electrode 16 and is in close contact with both the lid 8 and the air electrode 16. The water repellent ventilation member 40 has a size that covers the whole of the venting passage 30, the inlet side venting hole 32 and the outlet side venting hole 34 of the lid 8.

The container body 6 containing the electrode group 10, the adjustment member 36 and the water repellent venting member 40 as described above is covered with the lid 8 after a predetermined amount of alkali electrolyte solution is poured. Then, as schematically illustrated in FIG. 1, peripheral edge portions 46 and 48 of the container 4 (the container body 6 and the lid 8) are sandwiched from top and bottom by the connectors 50 and 52. The battery 2 is formed in this way.

In addition, as the alkaline electrolyte solution described above, the general alkaline electrolyte solution used for an alkaline secondary battery is preferably used. Specifically, an aqueous solution which contains at least one of NaOH, KOH, and LiOH as a solute is used.

Here, in the battery 2, the venting passage 30 of the lid 8 is opposed to the water repellent venting member 40. Since the water repellent venting member 40 allows gas to pass but blocks moisture, the air electrode 16 is open to the atmosphere via the water repellent venting member 40, the venting passage 30, the inlet side venting hole 32 and the outlet side venting hole 34. That is, the air electrode 16 comes into contact with the atmosphere through the water repellent venting member 40.

In the battery 2, an air electrode lead (positive electrode lead) 54 is electrically connected to the air electrode (positive electrode) 16, while a negative electrode lead 56 is electrically connected to the negative electrode 12. Although the air electrode lead 54 and the negative electrode lead 56 are schematically illustrated in FIG. 1, these are drawn out of the container 4 from the outlets 24 and 26 while maintaining air-tightness and water-tightness. An air electrode terminal (positive electrode terminal) 58 is provided at the tip of the air electrode lead 54, while a negative electrode terminal 60 is provided at the tip of the negative electrode lead 56. Therefore, in the battery 2, an air electrode terminal 58 and a negative electrode terminal 60 are used to input and output current during charging and discharging.

EXAMPLES

1. Production of Battery

Example 1

(1) Air Electrode Catalyst Synthesis

As a first step, a predetermined amount of Bi $(NO_3)_3 \cdot 5H_2O$ and $RuCl_3 \cdot 3H_2O$ was provided. These $Bi(NO_3)_3 \cdot 5H_2O$ and $RuCl_3 \cdot 3H_2O$ were introduced at the same concentration into distilled water at 75° C. and stirred to prepare a mixed aqueous solution of $Bi(NO_3)_3 \cdot 5H_2O$ and $RuCl_3 \cdot 3H_2O$. Then, a 2 mol/L NaOH aqueous solution was added to this mixed aqueous solution. The bath temperature at this time was set at 75° C., and the solution was stirred under oxygen bubbling. While the solution containing a precipitate generated by this operation was maintained at 85° C., a portion of the moisture was evaporated to form a paste. This paste was transferred to an evaporating dish and heated to 120° C. This paste was dried while maintained in the state for 12 hours to obtain a dried product of the paste (precursor).

Then, as a second step, this dried product was pulverized in a mortar then heated under an air atmosphere to 400° C., calcined while maintained for 1 hour to obtain a calcined product. The calcined product obtained was washed with distilled water at 70° C., then filtered with suction, and dried at 120° C. This resulted in a pyrochlore-type bismuth-ruthenium oxide.

The bismuth-ruthenium oxide obtained was pulverized using a mortar to obtain a bismuth-ruthenium oxide powder, which was an assembly of particles having a predetermined particle size. As a result of observation on a secondary electron image of this bismuth-ruthenium oxide powder obtained using a scanning electron microscope, the bismuth-ruthenium oxide had a particle size of 0.1 μm or less.

Subsequently, as a third step, 2 g of the bismuth-ruthenium oxide powder, along with 40 mL of nitric acid aqueous solution, was placed in the stirring tank of a stirrer and stirred for 1 hour while the temperature of the nitric acid aqueous solution was maintained at 25° C. Here, the concentration of the nitric acid aqueous solution was set at 2 mol/L.

After the stirring was completed, the bismuth-ruthenium oxide powder was taken out from the nitric acid aqueous solution by filtering with suction. The bismuth-ruthenium oxide powder taken out was washed with 1 liter of ion exchanged water heated to 70° C. After washing, the bismuth-ruthenium oxide powder was placed in a reduced pressure vessel at room temperature of 25° C. and dried while maintained under a reduced pressure environment for 12 hours.

In the manner as mentioned above, obtained was a bismuth-ruthenium oxide powder subjected to a nitric acid-treatment, that is, an air catalyst for an air secondary battery. Here, some of the obtained air electrode catalyst was used as analytical samples, and the rest was used for air electrode production.

(2) Production of Air Electrode

A nickel powder as an assembly of nickel particles was also provided. This nickel particles had an average particle size of 10 to 20 μm.

A polytetrafluoroethylene (PTFE) dispersion and ion exchanged water were further provided.

To the bismuth-ruthenium oxide powder obtained in the manner described above, nickel powder, polytetrafluoroethylene (PTFE) dispersion, and ion exchanged water were mixed. At this time, the bismuth-ruthenium oxide powder in an amount of 20 parts by mass, the nickel powder in an amount of 70 parts by mass, the PTFE dispersion in an amount of 10 parts by mass, and the ion exchanged water in an amount of 30 parts by mass were uniformly mixed to produce an air electrode mixture paste.

The air electrode mixture paste obtained was shaped into a sheet form. This air electrode mixture paste in a sheet form was pressure-bonded by a press onto nickel mesh having a mesh number of 60, a wire diameter of 0.08 mm, and an opening ratio of 60%.

The air electrode mixture paste pressure-bonded on the nickel mesh was heated to 340° C. under a nitrogen gas atmosphere and calcined while maintained at this temperature for 13 minutes. The sheet of the air electrode mixture calcined was cut to a size of 40 mm in length and 40 mm in width to thereby obtain an air electrode 16. The air electrode 16 had a thickness of 0.23 mm In the air electrode 16 obtained, the amount of the bismuth-ruthenium oxide powder (pyrochlore-type composite oxide catalyst) was 0.23 g.

(3) Production of Negative Electrode

Metal materials of Nd, Mg, Ni, and Al were mixed at a predetermined molar ratio, then introduced in a high-frequency induction melting furnace, and melted under an argon gas atmosphere. The melted metal obtained was poured into a mold and cooled to room temperature of 25° C. to produce an ingot.

Subsequently, this ingot was subjected to a thermal treatment by being maintained under an argon gas atmosphere at a temperature of 1000° C. for 10 hours. Then, the ingot was pulverized mechanically under an argon gas atmosphere to obtain a rare earth-Mg-Ni-based hydrogen storage alloy powder. The volume average particle size (MV) of the rare earth-Mg-Ni-based hydrogen storage alloy powder obtained was measured by a laser diffraction-scattering particle size distribution analyzer. As a result, the volume average particle size (MV) was 60 μm.

The composition of this hydrogen storage alloy powder was analyzed by inductively coupled high-frequency plasma spectroscopy (ICP) to find that the composition was $Nd_{0.89}Mg_{0.11}Ni_{3.33}Al_{0.17}$.

To 100 parts by mass of the hydrogen storage alloy powder obtained were added 0.2 parts by mass of a sodium polyacrylate powder, 0.04 parts by mass of a carboxymethyl cellulose powder, 3.0 parts by mass of a dispersion of styrene butadiene rubber, 0.5 parts by mass of a carbon black powder, and 22.4 parts by mass of water, and the mixture was kneaded under an environment of 25° C. to prepare a negative electrode mixture paste.

This negative electrode mixture paste was packed into a foam nickel sheet having an areal density (basis weight) of about 250 g/m$^2$ and a thickness of about 0.6 mm and dried to obtain a foam nickel sheet packed with the negative electrode mixture. The sheet obtained was rolled to increase the alloy content per volume, and cut to a size of 40 mm in length and 40 mm in width to thereby obtain a negative electrode 12. The negative electrode 12 had a thickness of 0.25 mm.

Next, the negative electrode 12 obtained was subjected to an activation treatment. The procedure of this activation treatment is shown below.

First, a common sintered nickel hydroxide positive electrode was provided. Note that, as this nickel hydroxide positive electrode, provided was one having a positive electrode capacity sufficiently larger than the negative electrode capacity of the negative electrode 12. Then, this nickel hydroxide positive electrode and the negative electrode 12 obtained were stacked with a separator formed of polyethylene non-woven fabric interposed therebetween to form an electrode group for an activation treatment. This electrode group for an activation treatment, along with a predetermined amount of an alkali electrolyte solution, was accommodated in a container made of an acrylic resin. Thereby, a single electrode cell for a nickel hydride secondary battery was formed.

As an initial charge and discharge operation, this single electrode cell was left to stand under an environment at a temperature of 25° C. for 5 hours, then charged at 0.1. It for 14 hours, and then discharged at 0.5 It until the battery voltage reached 0.70 V. Next, as a second charge and discharge operation, the cell was charged at 0.5 It for 2.8 hours under an environment at a temperature of 25° C. and then discharged at 0.5 It until the battery voltage reached 0.70 V. The second charge and discharge operation described above was taken as one cycle. In the third and later operations, the negative electrode 12 was subjected to an activation treatment by performing this charge and discharge cycle in a plurality of times. In each charge and discharge cycle, the capacity of the single electrode cell was determined. Then, the maximum value of the capacities obtained was taken as the capacity of the negative electrode. The negative electrode had a capacity of 640 mAh.

Thereafter, the single electrode cell was charged at 0.5 It for 2.8 hours and then, the negative electrode 12 was removed from the single electrode cell. In this manner, obtained was a negative electrode 12 subjected to the activation treatment and charging.

(4) Production of Air Hydrogen Secondary Battery

The air electrode 16 and the negative electrode 12 obtained were stacked with a separator 14 sandwiched therebetween to produce an electrode group 10. The separator 14 used for the production of this electrode group 10 was formed of non-woven fabric made of polypropylene fiber having a sulfone group and had a thickness of 0.1 mm (basis weight 53 g/m$^2$).

Next, the container body 6 was prepared, and the electrode group 10 described above was accommodated in the container body 6. At this time, a foam nickel sheet as the adjustment member 36 was disposed on the bottom wall 18 of the container body 6, and the electrode group 10 was disposed on the adjustment member 36. Here, the foam nickel sheet has a square shape with a thickness of 1 mm, a length of 40 mm and a width of 40 mm.

Next, the water repellent venting member 40 was provided on the electrode group 10 (on the air electrode 16). The PTFE porous film 42 having a length of 45 mm, a width of 45 mm and a thickness of 0.1 mm and the nonwoven fabric diffusion paper 44 having a length of 40 mm, a width of 40 mm and a thickness of 0.2 mm are combined to form the water repellent venting member 40.

Thereafter, 2 mL of alkali electrolyte-solution (5 mol/L KOH aqueous solution) was poured into the container body 6.

Next, the lid 8 was placed so as to close the opening 22 of the container body 6. At this time, in order that the water repellent venting member 40 covers an entire area in the inner surface 28 of the lid 8 including the venting passage 30, the inlet side venting hole 32 and the outlet side venting hole 34, the area and the water-repellent vent member 40 are in a close contact with each other. Here, the venting passage 30 has a single serpentine shape as a whole. The cross section of the venting passage 30 has a rectangular shape, in which a length dimension is 1 mm and a width dimension is 1 mm. The venting passage 30 is open on the water repellent venting member 40 side.

The peripheral edge portions 46 and 48 of the container 4 formed by combining the container body 6 and the lid 8 are sandwiched from top and bottom by the connectors 50 and 52. A resin packing (not shown) is provided at the contact portion between the container body 6 and the lid 8 to prevent leakage of alkali electrolyte-solution.

In the manner described above, a battery 2 was produced, as shown in FIG. 1. The battery 2 obtained was left to stand under an environment at a temperature of 25° C. for an hour to allow the alkali electrolyte solution to permeate the electrode group 10.

Note that the air electrode lead 54 is electrically connected to the air electrode 16 and the negative electrode lead 56 is electrically connected to the negative electrode 12. The air electrode lead 54 and the negative electrode lead 56 appropriately extend from the lead wire outlets 24 and 26 to the outside of the container 4 while air-tightness and water-tightness of the container 4 is maintained. Additionally, the air electrode terminal 58 is attached to the tip of the air electrode lead 54, and the negative electrode terminal 60 is attached to the tip of the negative electrode lead 56.

Comparative Example 1

In a calcining treatment of the second step when producing bismuth-ruthenium oxide, an air-hydrogen secondary battery was produced in the same manner as in Example 1 except that a calcining temperature was 300° C.

Comparative Example 2

In a calcining treatment of the second step when producing bismuth-ruthenium oxide, an air-hydrogen secondary battery was produced in the same manner as in Example 1 except that a calcining temperature was 600° C.

Figure 2:
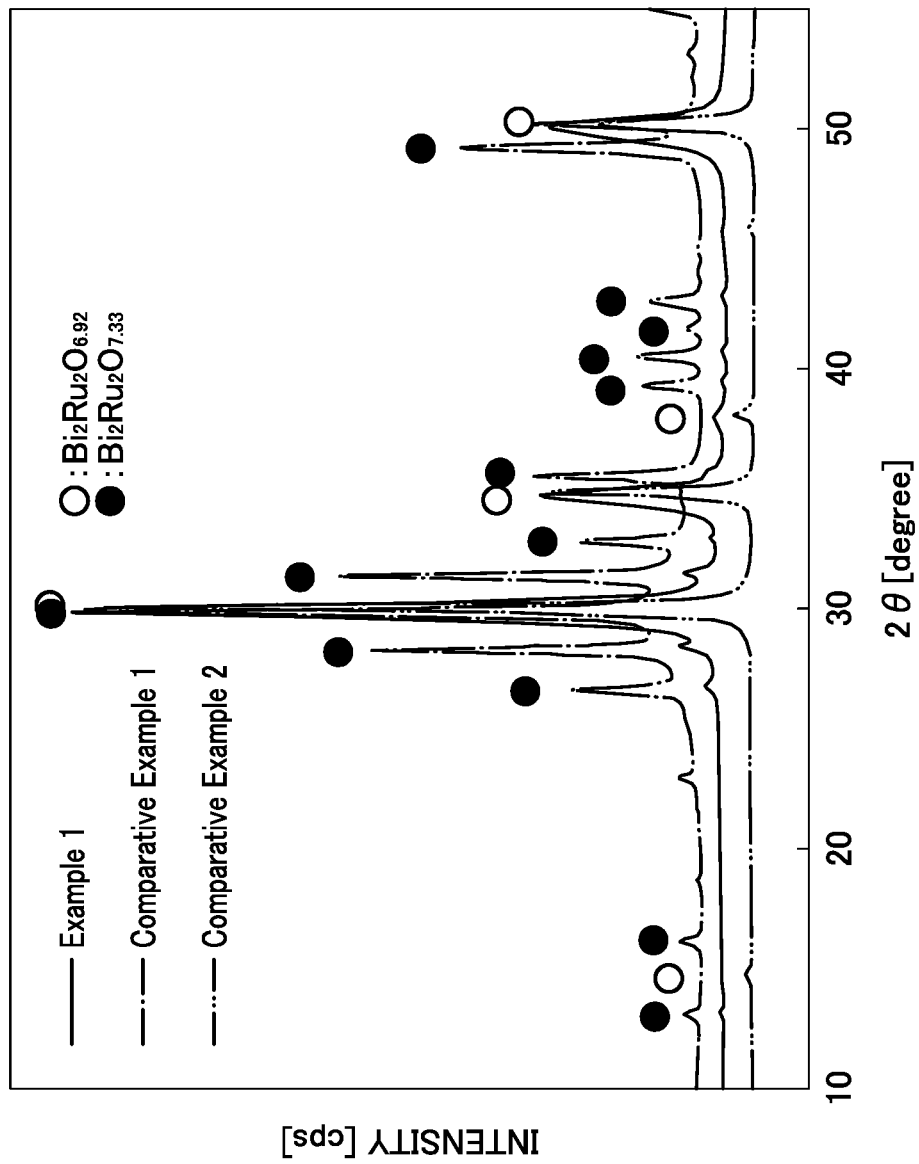
FIG. 2 is an X-ray diffraction (XRD) profile of an air electrode catalyst of Example 1, Comparative Example 1 and Comparative Example 2.
Figure 3:
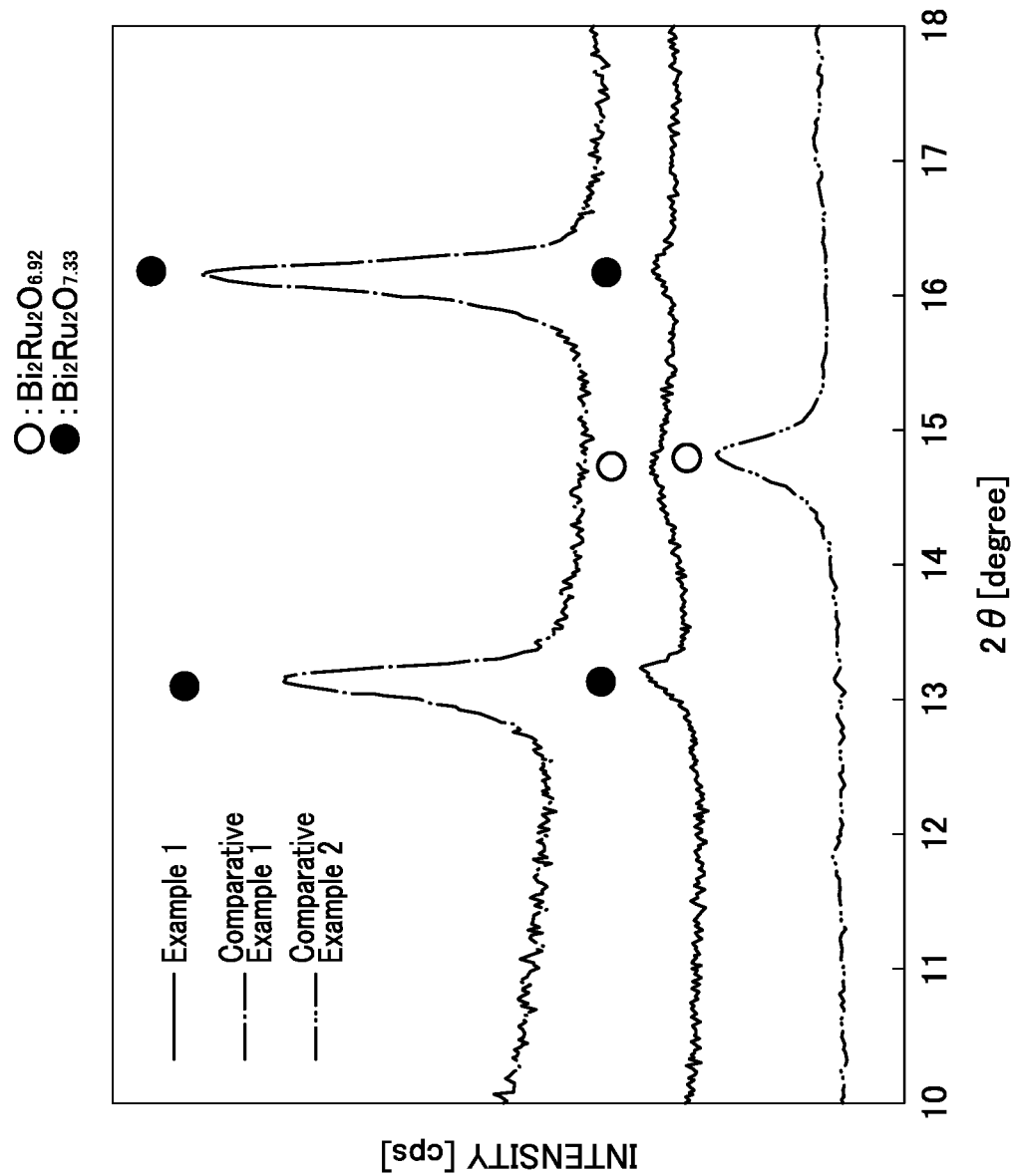
FIG. 3 is an XRD profile in which a range of 10 degrees to 18 degrees is enlarged in 2θ of FIG. 2.
Figure 4:
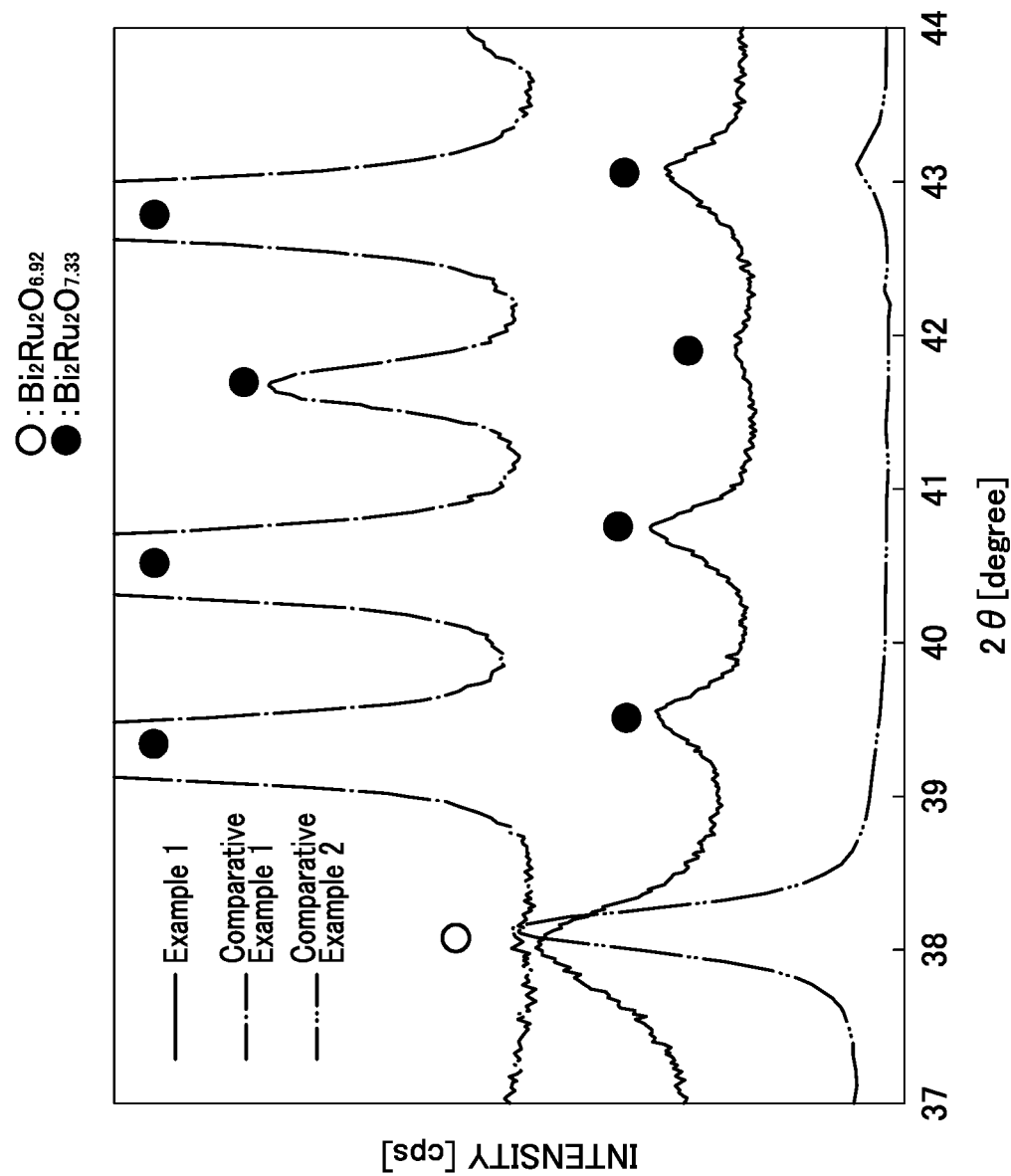
FIG. 4 is an XRD profile in which a range of 37 degrees to 44 degrees is enlarged in 2θ of FIG. 2.

2. Evaluation of Air Hydrogen Secondary Batteries
(1) X-Ray Diffraction (XRD) Analysis of Air Electrode Catalyst X-ray diffraction (XRD) analysis was performed on the sample for analysis of the air electrode catalysts of Example 1 and Comparative Examples 1 and 2. A parallel beam X-ray diffractometer was used for the analysis. The analysis conditions were as follows: the X-ray source was CuKα, the tube voltage was 40 kV, the tube current was 15 mA, the scan speed was 1 degree/min, and the step width was 0.01 degree. The profiles of the analysis results are shown in FIGS. 2 to 4. Here, FIG. 2 is an overall profile, and FIGS. 3 and 4 are partially enlarged profiles of FIG. 2.

Also, the peak position and lattice constant of the strongest line were obtained from the analysis results. The obtained results are shown in Table 1.

(2) Discharging Tests

For the air hydrogen secondary batteries of Example 1 and Comparative Examples 1 and 2, charging via the air electrode terminal 58 and the negative electrode terminal 60 at 0.5 It for 1.2 hours and discharging at 0.5 It to a battery voltage of 0.4 V were taken as one cycle, and this charging and discharging was repeated 10 cycles. At this time, irrespective of charging or discharging, air was introduced from the inlet side vent hole 32 and air was discharged from the outlet side vent hole 34, so that the venting passage 30 was continuously provided with air at a rate of 53 mL/minute. Note that the negative electrode capacity (640 mAh) was 1 It.

Then, the discharge capacity and voltage were measured at each cycle.

Figure 5:
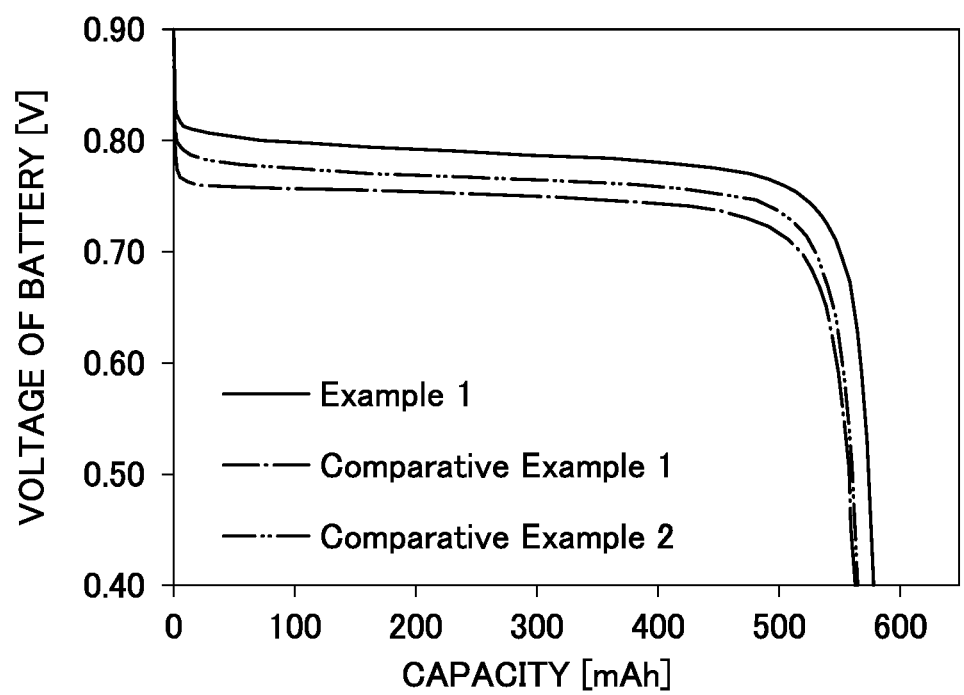
FIG. 5 is a graph showing discharge characteristic curves of air hydrogen secondary batteries of Example 1, Comparative Example 1 and Comparative Example 2.

Here, a discharge characteristic curve was obtained from the relation between the discharge capacity and voltage at the start of discharge. The results are shown in FIG. 5.

The battery voltage when the value of the discharge capacity reached the half value of the total discharge capacity was determined as an intermediate voltage. Of intermediate voltages obtained, the value at the start of discharge was shown as the discharge intermediate voltage in Table 1.

TABLE 1

| | Calcining temperature of air electrode catalyst [° C.] | Peak position of strongest line [degree] | Lattice constant [Å] | Discharge intermediate voltage [V] |
|---|---|---|---|---|
| Example 1 | 400 | 29.97 | 10.298 | 0.788 |
| Comparative Example 1 | 300 | 29.83 | 9.437 | 0.751 |
| Comparative Example 2 | 600 | 30.04 | 10.271 | 0.766 |

(3) Discussion

From FIGS. 2 to 4, in Comparative Example 1 where a calcining temperature of the air electrode catalyst was 300° C., the diffraction peaks almost identical to the diffraction peaks corresponding to $Bi_2Ru_2O_{7.33}$ of JCPD card 01-082-0380 indicated by black circles (●) were confirmed. The diffraction peaks of $Bi_2Ru_2O_{6.92}$ of JCPD card 01-082-0381 indicated by white circles (○) were not, however, confirmed.

Meanwhile, in Example 1 where a calcining temperature of the air electrode catalyst was 400° C., although there was a slight peak shift, the diffraction peaks of both $Bi_2Ru_2O_{7.33}$ of JCPD card 01-082-0380 and $Bi_2Ru_2O_{6.92}$ of JCPD card 01-082-0381 were confirmed. That is, it can be seen that two types of crystal structures having a different amount of oxygen were present.

Further, in Comparative Example 2 where a calcining temperature of the air electrode catalyst was 600° C., only the diffraction peaks of $Bi_2Ru_2O_{6.92}$ of JCPD card 01-082-0381 were confirmed.

From the results of FIG. 5 showing the discharge characteristic curves of Example 1 and Comparative Examples 1 and 2, the discharge characteristic curve of Example 1 shifted to the higher discharge voltage compared to the discharge characteristic curves of Comparative Examples 1 and 2. That is, in Example 1, it can be seen that overvoltage on the discharging side was reduced.

Further, from the results of Table 1 showing the discharge intermediate voltages, while the discharge intermediate voltage of Comparative Example 1 was 0.751 V and the discharge intermediate voltage of Comparative Example 2 was 0.766 V, the discharge intermediate voltage of Example 1 was improved to 0.788 V. That is, it can be seen that overvoltage on the discharge side was reduced.

From the above, it can be said that a discharge voltage increased most in Example 1 in which two phases of $Bi_2Ru_2O_{7.33}$ and $Bi_2Ru_2O_{6.92}$ having a different amount of oxygen coexisted. This is because a charge transfer resistance was reduced by the improvement of an oxygen reduction activity. Such improvement in discharge characteristics is considered to result from multiple functions of catalyst that a synergistic effect is produced due to the presence of crystal phases having a different amount of oxygen, whereby a bond strength between oxygen and a surface of catalyst is changed, or a decomposition of hydrogen peroxide ion, which is an intermediate in the two-electron reduction process, is promoted. Example 1 described above has diffraction peaks of both $Bi_2Ru_2O_{7.33}$ and $Bi_2Ru_2O_{6.92}$, but the same effect can be expected even with a pyrochlore-type composite oxide catalyst having a crystal structure similar to each crystal structure. Further, although the pyrochlore-type composite oxide catalyst of Example 1 has a two-phase crystal structure, the same effect can be expected even with a pyrochlore type composite oxide catalyst having a crystal structure with three or more phases having a different amount of oxygen.

The present disclosure is not limited to the embodiment and examples described above. Examples of a catalyst for an air secondary battery include oxides of selectable elements exemplified by the general formula representing the composition of the pyrochlore-type composite oxide described above, in addition to bismuth-ruthenium oxide. Further, a pyrochlore type composite oxide is not limited to an embodiment having two crystal structures, and may include more than two crystal structures, that is, three or more crystal structures. In this case, each crystal structure is configured to have at least a different amount of oxygen.

Furthermore, the present disclosure is not limited to air hydrogen secondary batteries, and may be applied to other air secondary batteries including Zn, Al, Mg, or Li as a metal for use in the negative electrode. Such other air secondary batteries can also obtain the effect of reducing overvoltage on the discharge side in the same manner as the above-described air-hydrogen secondary batteries.

<Aspects of Present Disclosure>

According to a first aspect of the present disclosure, provided is an air electrode catalyst for an air secondary battery, including a pyrochlore-type composite oxide represented by the general formula: $A_{2-x}B_{2-y}O_{7-z}$, wherein x, y, and z satisfy relations of $0 \leq x \leq 1$, $0 \leq y \leq 1$ and $-0.5 \leq z \leq 0.5$ respectively, A represents at least one element selected from Bi, Pb, Tb, La, Ce, Pr, Nd, Pm, Sm, Eu, Gd, Dy, Ho, Er, Tm, Yb, Lu, Mn, Y, Zn, and Al, and B represents at least one element selected from Ru, Ir, Si, Ge, Ta, Sn, Hf, Zr, Ti, Nb, V, Sb, Rh, Cr, Re, Sc, Co, Cu, In, Ga, Cd, Fe, Ni, W, and Mo, the pyrochlore-type composite oxide having two or more crystal structures having a different amount of oxygen.

A second aspect of the present disclosure is the air electrode catalyst for an air secondary battery according to the first aspect of the present disclosure described above, wherein the pyrochlore-type composite oxide is bismuth ruthenium oxide.

A third aspect of the present disclosure is the air electrode catalyst for an air secondary battery according to the first aspect or the second aspect of the present disclosure described above, wherein the pyrochlore-type composite oxide at least has a crystal structure represented by $Bi_2Ru_2O_{6.92}$ or a crystal structure similar to the crystal structure represented by $Bi_2Ru_2O_{6.92}$, and a crystal structure represented by $Bi_2Ru_2O_{7.33}$ or a crystal structure similar to the crystal structure represented by $Bi_2Ru_2O_{7.33}$.

According to a fourth aspect of the present disclosure, provided is an air secondary battery including an electrode group including an air electrode and a negative electrode stacked with a separator therebetween, and a container accommodating the electrode group along with an alkali electrolyte solution, wherein the air electrode includes the air electrode catalyst for an air secondary battery according to any one of the first aspect to the third aspect of the present disclosure.

A fifth aspect of the present disclosure is the air secondary battery according to the fourth aspect of the present disclosure described above, wherein the negative electrode includes a hydrogen storage alloy.

An air electrode catalyst for an air secondary battery according to the present disclosure smoothly transfers oxygen in a discharge reaction, and as a result, contributes to reducing overvoltage in the discharge reaction. Thus, an air secondary battery including the air electrode catalyst has improved energy efficiency and high output. For this reason, according to the present disclosure, it is possible to provide an air electrode catalyst for an air secondary battery capable of reducing overvoltage in a discharge reaction, and an air secondary battery including this air electrode catalyst, in which the energy efficiency and achieved high output have improved.

The disclosure being thus described, it will be obvious that the same may be varied in many ways. Such variations are not to be regarded as a departure from the spirit and scope of the disclosure, and all such modifications as would be obvious to one skilled in the art are intended to be included within the scope of the following claims.

What is claimed is:

1. An air electrode catalyst for an air secondary battery, comprising:

a pyrochlore-type composite oxide that is bismuth ruthenium oxide represented by the general formula:

$$Bi_{2-x}Ru_{2-y}O_{7-z},$$

wherein x, y, and z satisfy relations of $0 \leq x \leq 1$, $0 \leq y \leq 1$ and $-0.5 \leq z \leq 0.5$ respectively, the bismuth ruthenium oxide having two or more crystal structures having a different amount of oxygen; and wherein the pyrochlore-type composite oxide at least has a crystal structure represented by $Bi_2Ru_2O_{6.92}$ and a crystal structure represented by $Bi_2Ru_2O_{7.33}$.

2. An air secondary battery comprising:

an electrode group including an air electrode and a negative electrode stacked with a separator therebetween; and a container accommodating the electrode group along with an alkali electrolyte solution, wherein the air electrode includes the air electrode catalyst for an air secondary battery according to claim 1.

3. The air secondary battery according to claim 2, wherein the negative electrode includes a hydrogen storage alloy.

* * * * *